(12) United States Patent
Nakamura et al.

(10) Patent No.: US 9,237,574 B2
(45) Date of Patent: Jan. 12, 2016

(54) SPECTRUM CONTROL SYSTEM, DATABASE, SPECTRUM CONTROL METHOD, AND NON-TRANSITORY COMPUTER-READABLE MEDIUM STORING SPECTRUM CONTROL PROGRAM

(71) Applicants: Toshifumi Nakamura, Tokyo (JP); Hiroto Sugahara, Tokyo (JP)

(72) Inventors: Toshifumi Nakamura, Tokyo (JP); Hiroto Sugahara, Tokyo (JP)

(73) Assignee: NEC Corporation, Tokyo (JP)

( * ) Notice: Subject to any disclaimer, the term of this patent is extended or adjusted under 35 U.S.C. 154(b) by 85 days.

(21) Appl. No.: 14/350,449

(22) PCT Filed: Oct. 24, 2012

(86) PCT No.: PCT/JP2012/006818
§ 371 (c)(1),
(2) Date: Apr. 8, 2014

(87) PCT Pub. No.: WO2013/061586
PCT Pub. Date: May 2, 2013

(65) Prior Publication Data
US 2014/0248916 A1  Sep. 4, 2014

(30) Foreign Application Priority Data
Oct. 26, 2011 (JP) .................................. 2011-235072

(51) Int. Cl.
*H04B 1/00* (2006.01)
*H04W 72/04* (2009.01)
*H04W 16/14* (2009.01)

(52) U.S. Cl.
CPC .......... *H04W 72/0453* (2013.01); *H04W 16/14* (2013.01)

(58) Field of Classification Search
None
See application file for complete search history.

(56) References Cited

U.S. PATENT DOCUMENTS

| 7,299,019 | B1 * | 11/2007 | Austin | H04W 36/22 455/161.3 |
| 2004/0164247 | A1 * | 8/2004 | Riehle | C07B 43/02 250/339.09 |

(Continued)

FOREIGN PATENT DOCUMENTS

| JP | 2007-184850 A | 7/2007 |
| JP | 2009-177403 A | 8/2009 |

(Continued)

OTHER PUBLICATIONS

International Search Report corresponding to PCT/JP2012/006818 dated Dec. 4, 2012 (3 pages).

(Continued)

*Primary Examiner* — Dominic E Rego
(74) *Attorney, Agent, or Firm* — Wilmer Cutler Pickering Hale and Dorr LLP

(57) ABSTRACT

A spectrum control system according to the present invention is a spectrum control system that evaluates whether or not to allow a second wireless communication system to perform secondary use on a frequency band that is allowed to be preferentially used by a first wireless communication system, and includes a request distinguish unit (102) that evaluates a possibility of the secondary use influencing the first wireless communication system and an evaluation unit (101) that evaluates whether or not to allow the secondary use of the frequency band, which has been evaluated that there is a possibility that the frequency band may influence the first wireless communication system using an evaluation criterion more specific than that of the request distinguish unit (102).

10 Claims, 13 Drawing Sheets

(56) References Cited

U.S. PATENT DOCUMENTS

| | | | |
|---|---|---|---|
| 2008/0123724 A1* | 5/2008 | Yen | H04B 1/38 375/220 |
| 2008/0192638 A1* | 8/2008 | Massiera | H04W 36/30 370/237 |
| 2010/0145745 A1* | 6/2010 | Stanforth | G06Q 10/06 705/59 |
| 2010/0323694 A1 | 12/2010 | Altintas | |

FOREIGN PATENT DOCUMENTS

| | | |
|---|---|---|
| JP | 2011-050032 A | 3/2011 |
| WO | WO-2009/104689 A1 | 8/2009 |

OTHER PUBLICATIONS

FCC 10-174, "Second Memorandum Opinion and Order," Sep. 23, 2010, pp. 1-88.

Toshifumi Nakamura, et al., "Site Specific Interference Estimation for Advanced Spectrum Management in Cognitive Radio Systems over White Space Spectrum," IEICE-SR2010-65, The Institute of Electronics, Information and Communication Engineers, Oct. 2010, (8 pages).

International Telecommunication Union (ITU), Method for point-to-area predictions for terrestrial services in the frequency range 300 MHz to 1000 MHz, Oct. 2009 (9 pages).

Electronic Communications Committee (ECC) within the European Conference of Postal and Telecommunications Administrations (CEPT), "Technical and Operation Requirements for the Possible Operation of Cognitive Radio Systems in the White Spaces of the Frequency Band 470-790MHz," ECC Report 159, Jan. 2011, pp. 23-35.

Yoshio Hosoya, "Radiowave Propagation Handbook", Realize Inc., Jan. 28, 1999, pp. 212-213.

* cited by examiner

SPECTRUM CONTROL SYSTEM, DATABASE, SPECTRUM CONTROL METHOD, AND NON-TRANSITORY COMPUTER-READABLE MEDIUM STORING SPECTRUM CONTROL PROGRAM

CROSS-REFERENCE TO RELATED APPLICATIONS

This application is a national stage application of International Application No. PCT/JP2012/006818 entitled "SPECTRUM CONTROL SYSTEM, DATABASE, SPECTRUM CONTROL METHOD, AND NON-TRANSITORY COMPUTER-READABLE MEDIUM STORING SPECTRUM CONTROL PROGRAM," filed on Oct. 24, 2012, which claims the benefit of the priority of Japanese patent application No. 2011-235072, filed on Oct. 26, 2011, the disclosures of each of which are hereby incorporated by reference in their entirety.

TECHNICAL FIELD

The present invention is related to a spectrum control system, a spectrum control method, and a spectrum control program that assigns an available spectrum to a wireless station that performs secondary use of a white space. Further, the present invention relates to a database for assigning an available spectrum.

BACKGROUND ART

Cognitive radio is attracting attention as a technique to handle an increase in traffic in wireless communication. There is a form of the cognitive radio that is currently being considered in which a secondary system performs a secondary use of a frequency channel (a white space) that is not used spatially and temporally by a licensed primary system in the range not influencing services operated by the primary system. As a related art concerning such an operation of the secondary use of the white spaces, there is a method disclosed in Non Patent Literature 1. In this method, for a position of a transmission station of a secondary system (a secondary transmission station) that performs the secondary use, a list of channels available for the secondary use at the position is stored to a database according to categories explained below. Further, by referring to the database at the time of performing the secondary use, the secondary transmission station obtains channels available for the secondary use at the position. Specifically, a service area of a primary system which should be protected is calculated as a protection zone by a predetermined propagation prediction method, and a required value of a separation distance from a boundary of the protection zone to the secondary transmission station is set according to the categories explained below. The categories of the secondary transmission station are: frequency channels for secondary use (channels the same as or adjacent to the primary system); a type of a secondary system transmitter (personal use, portable device, or fixed device); and an installation height of a transmission antenna (less than three meters, three meters or greater and less than ten meters, or ten meters or greater and less than 30 meters). An evaluation of whether or not the secondary use is allowed is made depending on whether the separation distance that is necessary according to these categories can be obtained at the position of the secondary transmission station. Results of the evaluations are stored to the database.

There are two problems with this above technique. The first problem is that the evaluation of whether or not the secondary use is allowed is based on the separation distance from an end of the protection zone, while terrain and feature of a propagation path from the secondary transmission station to a reception station of the primary system (a primary reception station) is not taken into account. The second problem is that an increase in a level of interference from the secondary use by a plurality of secondary transmission stations in the same time period is provided as a fixed margin, while the actual number of simultaneous secondary transmission stations is not taken into account. As a result, it has been highly possible to cause harmful interference on the primary reception station from the secondary use of the white space by the secondary transmission stations or miss a chance for the secondary use by the secondary transmission stations by maintaining a separation distance greater than necessary.

As a technique to solve the first problem, there is a method disclosed in Non Patent Literature 2. This method evaluates whether or not to allow the secondary use of channels based on a propagation prediction by using site-specific information between the secondary transmission station and the primary reception station so as to estimate the level of interference on the primary reception station from the secondary transmission station performing the secondary use, that should be considered. Accordingly, this method predicts the level of interference with higher accuracy than when the prediction is made only based on the separation distance. Therefore, it is possible to reduce the probability of creating harmful interference on the primary system and maintaining a separation distance greater than necessary.

As a technique to solve the second problem, there is a method disclosed in Patent Literature 1. This method obtains the number of secondary transmission stations that perform the secondary use in the same time period, predicts the total level of interference on the primary reception station when these secondary transmission stations start the secondary use, and confirms that the transmission power is configured not to exceed an allowable interference level before starting the secondary use. Thus, it is possible to reduce the possibility of creating harmful interference on the primary system or maintaining a separation distance greater than necessary.

CITATION LIST

Patent Literature
Patent Literature 1: Japanese Unexamined Patent Application Publication No. 2011-50032
Non Patent Literature
Non Patent Literature 1: FCC, "SECOND MEMORANDUM OPINION AND ORDER", September, 2010
Non Patent Literature 2: Toshifumi Nakamura, Hiroto Sugahara, Kazushi Muraoka, and Masayuki Ariyoshi, "Site Specific Interference Estimation for Advanced Spectrum Management in Cognitive Radio Systems over White Space Spectrum", IEICE-SR2010-65, THE INSTITUTE OF ELECTRONICS, INFORMATION AND COMMUNICATION ENGINEERS, October, 2010
Non Patent Literature 3: International Telecommunication Union "Method for point-to-area predictions for terrestrial services in the frequency range 30 MHz to 3000 MHz," October, 2009
Non Patent Literature 4: Electronic Communications Committee (ECC) within the European Conference of Postal and Telecommunications Administrations (CEPT), "TECHNICAL AND OPERATIONAL REQUIREMENTS FOR THE POSSIBLE OPERATION OF COG- NITIVE RADIO SYSTEMS IN THE WHITE SPACES OF THE FREQUENCY BAND 470-790 MHz", ECC Report 159, pp 23-35, January, 2011

Non Patent Literature 5: Yoshio Hosoya, "Radiowave Propagation Handbook", pp. 212-213, Realize Inc., 28 Jan. 1999

SUMMARY OF INVENTION

Technical Problem

There is a problem when the detailed calculation as described in Non Patent Literature 2 and Patent Literature 1 is performed in order to solve the problem in Non Patent Literature 1. The problem is that since calculation of a propagation loss by an analysis which takes into account the terrain requires a huge amount of time, if the analysis is performed after requesting the secondary use, it takes time to respond thereto. To solve this problem, it may be possible to previously calculate the propagation losses from candidate points of the secondary transmission stations to the primary reception station which should be protected based on highly accurate propagation prediction and store results thereof to a database. However in such a method, it is required to hold the propagation losses in the protection primary reception station according to the positions and categories of all the candidate secondary transmission stations, thereby bloating the size of the database. Further, if the secondary transmission station is a mobile device, the position of the secondary transmission station cannot be specified in advance. Thus this method cannot be applied in such a case.

An object of the present invention is to solve the above-mentioned problems and to provide a spectrum control system, a database, a spectrum control method, and a spectrum control program that minimizes harmful interference on the primary system and a loss of a chance for the secondary use by the secondary system while improving a response time to a secondary use request from the secondary transmission station.

Solution to Problem

A first exemplary aspect of the present invention is a spectrum control system that evaluates whether or not a frequency band, which is allowed to be preferentially used by a first wireless communication system, is allowed for secondary use by a second wireless communication system. The spectrum control system includes: first evaluation means for evaluating a possibility of the secondary use influencing the first wireless communication system; and second evaluation means for evaluating whether or not to allow the secondary use of the frequency band, which has been evaluated that there is a possibility that the frequency band may influence the first wireless communication system, using an evaluation criterion more specific than that of the first evaluation means.

A second exemplary aspect of the present invention is a database that stores, from among frequency bands which are allowed to be preferentially used by a first wireless communication system, frequency bands available to a second wireless communication system for secondary use in association with points of the second wireless communication system. The database stores a list of frequency bands evaluated as being allowed for the secondary use using a first evaluation criterion and a list of frequency bands which will be evaluated as to whether or not they will be allowed for the secondary use using a reference more specific than the first evaluation criterion.

A third exemplary aspect of the present invention is a spectrum control method that evaluates whether a frequency band, which is allowed to be preferentially used by a first wireless communication system, is allowed for secondary use by a second wireless communication system. The spectrum control method includes: evaluating a possibility of the secondary use influencing the first wireless communication system; and evaluating whether or not to allow the secondary use of the frequency band, it having been evaluated that there is a possibility that the frequency band may influence the first wireless communication system, using an evaluation criterion more specific than that of the first evaluation means.

A fourth exemplary aspect of the present invention is a non-transitory computer readable medium that stores a spectrum control program for evaluating whether a frequency band, which is allowed to be preferentially used by a first wireless communication system, is allowed for secondary use by a second wireless communication system. The program causes a computer to execute steps of: evaluating a possibility of the secondary use influencing the first wireless communication system; and evaluating whether or not to allow the secondary use of the frequency band, it having been evaluated that there is a possibility that the frequency band may influence the first wireless communication system, using an evaluation criterion more specific than that of the first evaluation means.

Advantageous Effects of Invention

According to the present invention, it is possible to provide a spectrum control system, a method, a program, and a database that minimize harmful interference on a primary system and a loss of a chance for secondary use by a secondary system while improving a response time to a secondary use request from the secondary transmission station.

DESCRIPTION OF EMBODIMENTS

First Exemplary Embodiment

Figure 1:
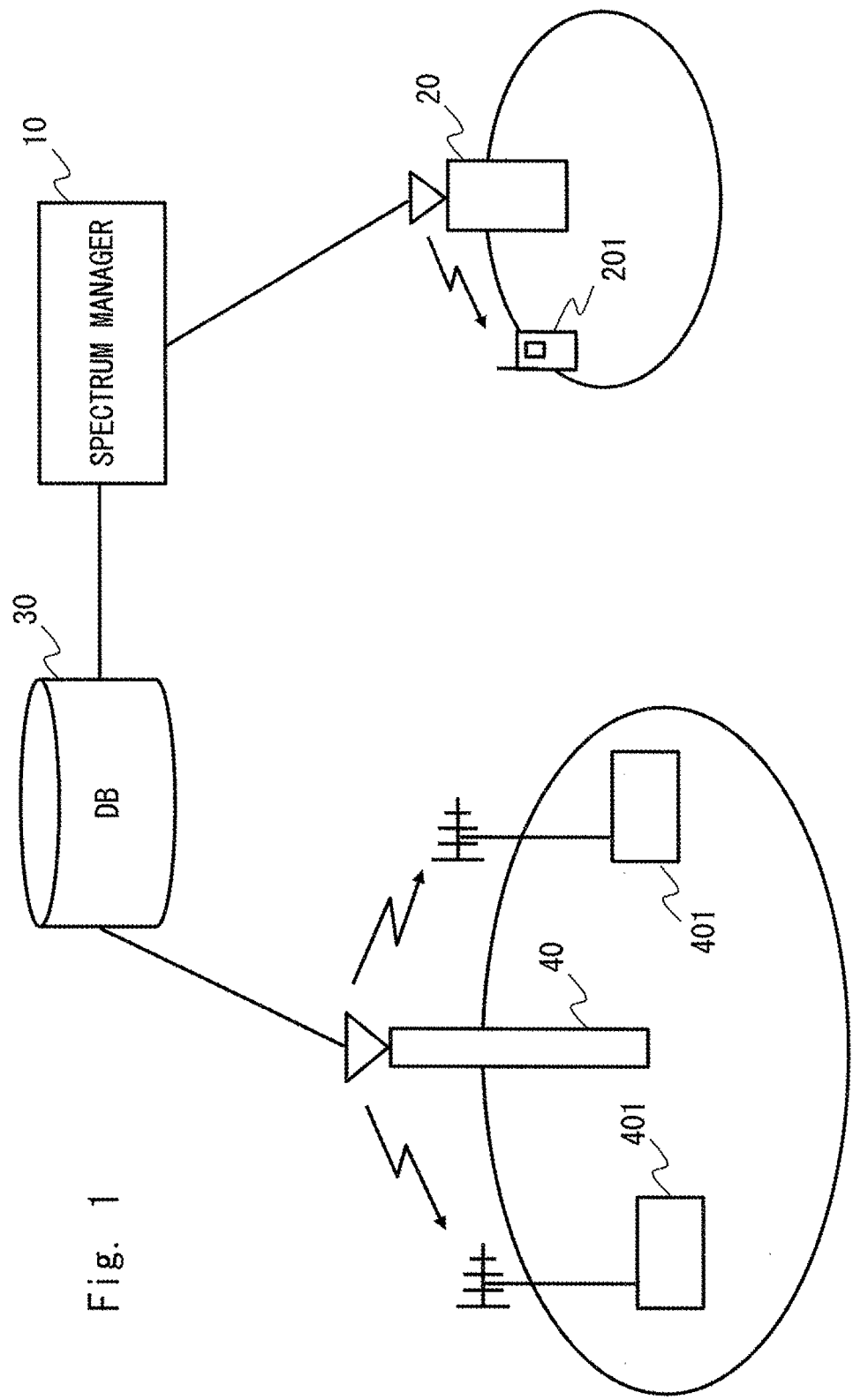
FIG. 1 is a block diagram of a wireless communication system according to a first exemplary embodiment.

Exemplary embodiments of the present invention shall be explained in detail with reference to the drawings. FIG. 1 is a pattern diagram of a wireless communication system according to a first exemplary embodiment. This system is configured to include a spectrum manager 10, a secondary transmission station 20, a reception station of a secondary system (a secondary reception station) 201, a database 30, a transmission station of a primary system (a primary transmission station) 40, and a primary reception station 401.

In the following explanation, it is assumed, for example, that the primary system is a TV broadcast system and the secondary system is a cellular system. It is obvious that this configuration is merely an example, and a combination of the primary system and the secondary system is not limited to such a configuration. The combination of the primary system and the secondary system may be, for example, a TV system and a WRAN (Wireless Regional Access Network) system, a TV system and regional radio or disaster prevention radio of a municipality or the like. Other examples are: the primary system may be a wireless microphone or radio for specific use (e.g., apartment house radio, corporate private radio, and farm's radio) and the secondary system may be a wireless LAN (Local Area Network).

The spectrum manager 10 has a function to notify the secondary transmission station 20 of a list of channels available for the secondary use based on information stored to the database 30 in response to a request (a primary request) sent from the secondary transmission station 20 for a notification of channels available for the secondary use as white spaces. The list of channels available for the secondary use shows associations between channels and information indicating that the channel is available or information indicating that the channel is not available for the secondary use at the present state but is available for the secondary use depending on a result of a detailed usage evaluation. Further, the spectrum manager 10 has a function to perform a detailed usage evaluation based on the information stored to the database 30 in response to a request (a secondary request), which will be explained later, from the secondary transmission station 20 for the detailed usage evaluation and to notify the secondary transmission station 20 of a result thereof.

The secondary transmission station 20 has a function to transmit the request for the secondary use of a white space to the spectrum manager 10. The requests here are: a primary request for a notification of channels available for the secondary use; and a secondary request for a detailed usage evaluation in response to the result of the primary request. Further, the secondary transmission station 20 has a function to, when there are a plurality of channels available for the secondary use that the spectrum manager 10 sends a notification thereof, select at least one of the channels and emit a radio signal to the secondary reception station 201 using the selected channel. Furthermore, the secondary transmission station 20 has a function to transmit at least one parameter for emitting the radio signal (e.g., a channel and transmission power) and information of the start and end of the secondary use to the spectrum manager 10 as a secondary use report. The secondary reception station 201 has a function to receive the radio signal emitted by the secondary transmission station 20.

The database 30 includes a database that stores, for a position of the secondary transmission station that performs the secondary use, a list of channels available for the secondary use at the position and a list of channels available for the secondary use depending on the result of the detailed usage evaluation. Further, the database 30 may store information on the primary system, information on the secondary system, and information for estimating a propagation path in detail, which will be explained later.

The primary transmitter 40 has a function to wirelessly emit, to the primary reception station 401, a signal using a channel that is allowed to preferentially operate. The primary reception station 401 has a function to receive the radio signal emitted from the primary transmitter 40.

Figure 2:
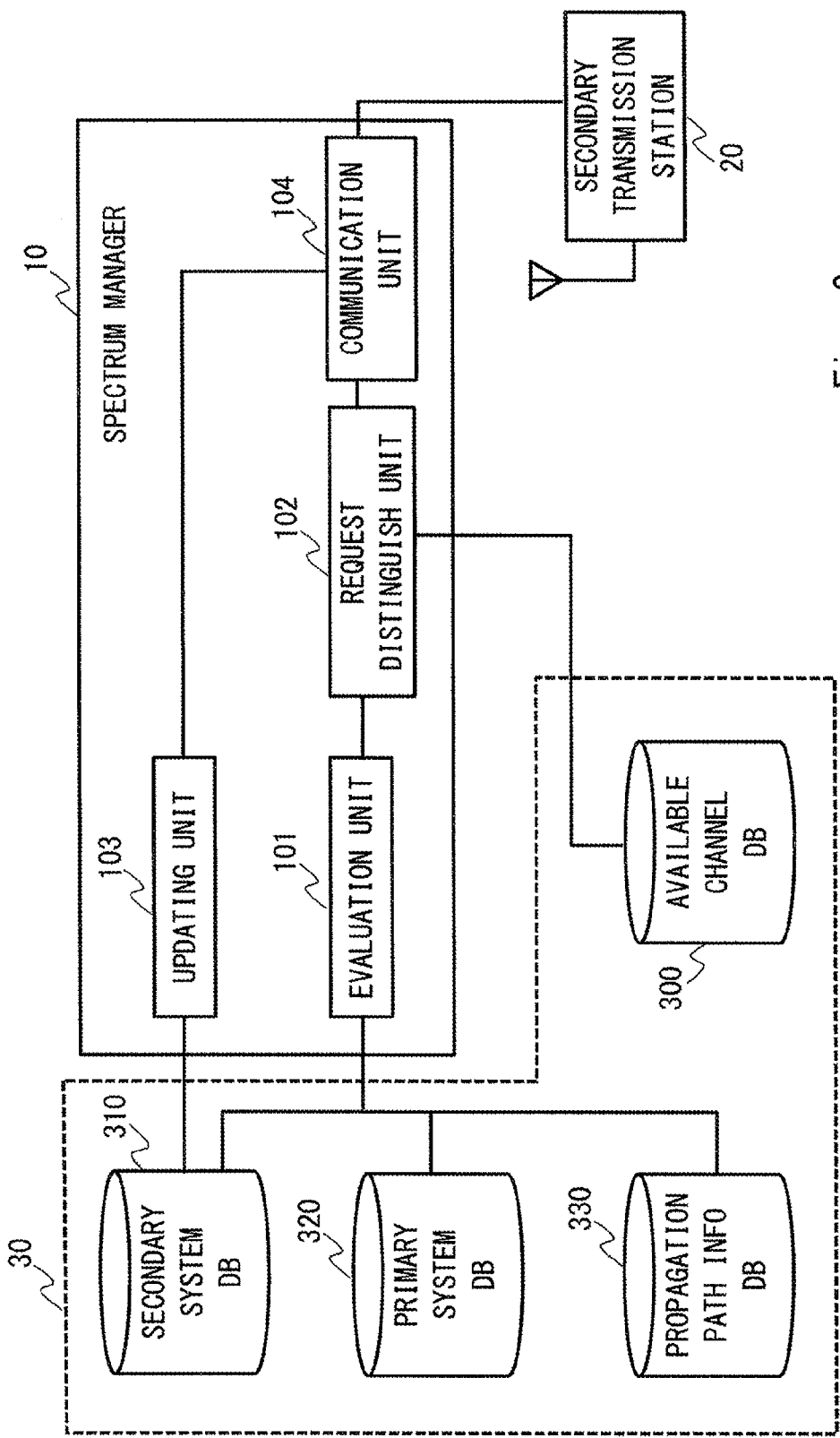
FIG. 2 is a block diagram of a spectrum manager and a database according to the first exemplary embodiment.

FIG. 2 shows a specific configuration example of the spectrum manager 10 and the database 30 and an example of a connection between the spectrum manager 10, the database 30, and the secondary transmission station 20.

The database 30 is configured to include an available channel database 300, a secondary system database 310, a primary system database 320, and a propagation path information database 330.

The primary system database 320 stores an installation position described by, for example, latitude/longitude and planar rectangular coordinates, an installation height, an operation channel and an operation time thereof, transmission power, and a transmission antenna gain and its radiation pattern of the respective primary transmission stations as information regarding the primary transmission station. Moreover, the primary system database 320 stores a protection zone, an installation position, an installation height, a reception antenna gain and its radiation pattern, and frequency attenuation characteristics of a reception filter of the primary reception station as information regarding the primary reception station 401. The protection zone is an area that enjoys services offered by a certain channel and is an area which should be protected so that it does not influence the primary reception station 401 when the secondary system performs the secondary use of the white space. The protection zone may be specified by, for example, a radius from the primary transmission station or by information of a contour line indicating the zone. Further, when the entire zone is divided into meshes of a predetermined spacing (e.g., 10 m), each mesh may be defined whether or not it is inside or outside the protection zone. As for the primary reception station, if the information such as the actual installation position, installation height, and antenna gain can be obtained, it is preferable to store these values. However, when the primary system is assumed to be, for example, a TV broadcast system, it is unrealistic to obtain information of all the reception stations installed on roofs of ordinary houses. In such a case, the primary reception stations may be assumed to exist at predetermined spacing (e.g., 10 m), and the installation positions of the primary reception stations may be specified in association with the mesh. Moreover, also when the protection zone is specified using a radius from the primary transmission station or a contour line that has arbitrarily been set, the installation position of the primary reception station may be specified in association with the protection zone. Further, as for the installation height, a value such as 10 m may be employed as a reference height. Furthermore, as for the reception antenna gain and the radiation pattern, a gain of a main lobe may be specified as 7 dBi and the front-to-back ratio may be specified as 14 dB as a reception antenna gain, or a radiation pattern of Yagi-Uda antenna, which is common as a radiation pattern, may be employed. Further, reception power and interference power of the primary reception station may be predicted in advance by a propagation prediction method described later using the above-mentioned information regarding the primary transmission station and information regarding the primary reception station, and the values of the reception power and the interference power may be stored to the primary system database 320. Furthermore, the primary system database 320 stores, as secondary use evaluation criteria, information of, for example, an allowable level of interference, a desired signal-to-interference-plus-noise ratio, and an overload threshold of the primary reception station.

The secondary system database 310 stores static information that is invariant with time and dynamic information that fluctuates with time in association with individual identifiers that are assigned to the respective secondary transmission stations. The static information is, specifically, a type of a transmitter, such as a fixed device and portable device, and in regard to the secondary transmission station, an installation position that is described by latitude/longitude and planar rectangular coordinates (in the case of the fixed device), an output range of transmission power, an installation height, a transmission antenna gain and its radiation antenna pattern, and leakage power characteristics into adjacent channels of the transmission filter. The dynamic information is, specifically, information regarding a secondary use state, such as a channel number that is in the secondary use, a transmission output of the channel that is in the secondary use, a position of the secondary transmission station described by latitude/longitude and planar rectangular coordinates (in the case of the portable device) or the like. Note that the dynamic information is updated at the time of starting an operation of the secondary use of the white space or at a predetermined cycle during operation. The updating processing is performed by an update unit 103 of the spectrum manager 10, which will be explained later.

The propagation path information database 330 stores terrain information and feature information that is necessary for a propagation prediction using the terrain information. The terrain information is, specifically, information describing altitude values at a predetermined spacing. The feature information is, specifically, information describing buildings and the like according to forms, such as a polygon. The information preferably includes information such as heights and the numbers of stories of the buildings. Alternatively, the terrain information may be data that describes land use information, such as whether the land is a residential area, cultivated area, river, or lake, for each sectioned zone.

The available channel database 300 is a database that stores, for respective groups categorized by the types of the secondary transmission stations and the installation heights of the secondary transmission stations in association with the positions described by latitude/longitude, planar rectangular coordinates, an address or the like, at least a list of channels (available channels) available for the secondary use at the positions and a list of channels (conditionally available channels) available for the secondary use depending on the results of the detailed usage evaluations.

The available channels and conditionally available channels stored to the available channel database 300 are categorized by, as an example, a method described below. To be more specific, assuming the secondary transmission station performs the secondary use of the white space in a predetermined channel (a channel to be evaluated for the secondary use) with a predetermined transmission output at a certain position (an evaluation position), a state of interference on the primary reception station that is enjoying services of the primary system in the predetermined channel or an adjacent channel thereto will be predicted. When the predicted state of interference exceeds a threshold (Th1), which is evaluated to be sufficiently high, the channel is evaluated to be the available channel at the position. Meanwhile, when the predicted state of interference is less than or equal to the above-mentioned threshold Th1 but exceeds a threshold (Th2), which is evaluated to apparently interfere, the channel is evaluated to be the conditionally available channel at the position. Further, when the predicted state of interference is less than or equal to Th2, the channel is evaluated as not being available for the secondary use (unavailable channel). This processing is performed on all candidate channels for the secondary use by the secondary transmission station 20 at all positions in the range managed by the spectrum manager 10, which will be explained later, and a result thereof is registered into the available channel database 300.

The method for predicting the above-mentioned state of interference shall be explained. The prediction of the state of interference is executed in advance before the primary transmission station 40, the secondary transmission station 20 and the like operate, and may be stored to the available channel database 300. Moreover, the prediction of the state of interference may be executed by a control device (not shown in the drawings) inside the database 30 or may be executed by a computer device or the like that is disposed outside the database 30. Firstly, the primary reception station to be evaluated for the state of interference is determined. To be specific, the position closest to the secondary transmission station as the evaluation position from among the installation positions of the primary reception stations described in the primary system database 320 may be the installation position of the primary reception station. Next, the primary reception station estimates signal reception power (S[dBm]) of the channel to be evaluated for the secondary use that is transmitted from the primary transmission station. Specifically, a propagation loss between the primary transmission station and the primary reception station is calculated by, for example, ITU-R P.1546 model disclosed in Non Patent Literature 3 using the installation height and the antenna installation height of the primary transmission station and the position and the antenna installation height of the primary reception station. Additionally, the reception power (S) is calculated using the transmission antenna gain and the radiation pattern of the primary transmission station, the transmission power, and the reception antenna gain and the radiation pattern of the primary reception station. Similarly, the interference power (Ip [dBm]) on the primary reception station from among the primary transmission stations other than the above primary transmission station is calculated. Further, the interference power (Io[dBm]) on the primary reception station when the secondary transmission station uses the channel to be evaluated for the secondary use at the evaluation position is calculated. As for the secondary transmission station assumed here, the values are set for the respective groups categorized according to the type of the secondary transmission station, the installation height of the secondary transmission station and the like, and a typical value is used as the installation height. Moreover, suppose that a monopole antenna with a gain of, for example, 6 dBi is used for the antenna gain and the radiation pattern. The Signal-to-Interference-plus-Noise-Ratio (SINR) at the primary reception station is calculated by the following expression. Note that the noise power shall be N.

$$SINR = S - \left\{ 10 \log_{10} \left( 10^{\frac{I_P}{10}} + 10^{\frac{I_Q}{10}} + 10^{\frac{N}{10}} \right) \right\} \quad \text{[Expression 1]}$$

By comparing the calculated SINR with Th1 or Th2, an evaluation of the available channel, conditionally available channel, or unavailable channel is performed. This processing is performed not only on a channel the same as the channel to be evaluated for the secondary use, but also on an adjacent channel. It is preferable to set Th1 and Th2 taking into account a margin for compensating a prediction error expected in the above-mentioned prediction of interference state and a margin for compensating an increase in the interference caused due to the secondary use by a plurality of secondary transmission stations of the same channel at the same time based on the secondary use evaluation criteria (e.g., the desired signal-to-interference-plus-noise ratio) that are stored to the primary system database 320. The setting method of these margins is described in Non Patent Literature 4. Specifically, the former margin is calculated based on a standard deviation of the prediction error and an interfere probability, while the latter margin is set according to the number of simultaneous secondary use. When Th1 is set by this method, the margins may be calculated using, for example, the interfering probability of 99% and the number of simultaneous secondary use of 100. When Th2 is set, the margins may be calculated using, for example, the interfering probability of 90% and the number of simultaneous secondary use of one.

Note that when a statistical method such as ITU-R P.1546 is used as a propagation prediction expression without taking into account characteristics such as the terrain and feature between the transmission and reception points, the propagation loss which will be calculated depends only on a distance between the transmission and reception points, provided that the installation positions and installation heights of the transmission and reception antennas are equivalent. In view of this, instead of performing the propagation prediction on individual evaluation positions, categorization of the available channels or conditionally available channels may be performed according to the distance from the evaluation position to the primary reception station.

Note that although the available channel database 300, the secondary system database 310, the primary system database 320, and the propagation path information database 330 are provided as components of the database 30, it is not limited to this configuration, and a configuration such that the static information of the secondary system database 310 is held in the secondary transmission station and the dynamic information is included in the spectrum manager 10 may be employed. As for other databases, they may be included as parts of other components instead of being included in the database 30.

The spectrum manager 10 is configured to include an evaluation unit 101, a request distinguish unit 102, the updating unit 103, and a communication unit 104. Moreover, as described below, the spectrum manager 10 is connected to the secondary transmission station 20 and the database 30. The evaluation unit 101 is connected to the secondary system database 310, the primary system database 320, and the propagation path information database 330 in the database 30. The request distinguish unit 102 is connected to the available channel database 300 in the database 30. The updating unit 103 is connected to the secondary system database 310 in the database 30. The communication unit 104 is connected to the secondary transmission station 20.

The evaluation unit 101 has a function to perform the detailed usage evaluation in response to the secondary request sent from the secondary transmission station using the information stored to the secondary system database 310, the primary system database 320, and the propagation path information database 330. Specifically, the signal-to-interference-plus-noise ratio of the primary reception station is calculated by the method similar to the above-mentioned interference state prediction, and a usage evaluation is performed on the conditionally available channel. However, this method is different from the above-mentioned interference state prediction in the following three points. Firstly, as for the installation position and the installation height of the secondary transmission station, the values of the secondary transmission station 20 that requests the secondary use are used. Secondly, as for the propagation state of radio waves from the secondary transmission station to the primary reception station, the propagation loss is estimated with high accuracy by a propagation prediction model taking into account the terrain using the terrain information that is stored to the propagation path information database. As an example of the propagation prediction model taking into account the terrain, there is a propagation prediction method disclosed in Non Patent Literature 5 that switches a plane ground propagation model and a mountain ridge diffraction model according to a cross-sectional structure between a transmission point and a reception point. Thirdly, a state of interference (Im:m=1, 2 and 3, ..., M) on the primary reception station by the other secondary transmission stations that perform the secondary use at the same time is calculated, and the signal-to-interference-plus-noise ratio in the primary reception station is calculated by the following expression.

$$SINR = S - \left\{ 10 \log_{10} \left( 10^{\frac{I_P}{10}} + \sum_{m=1}^{M} 10^{\frac{I_m}{10}} + 10^{\frac{N}{10}} \right) \right\} \quad \text{[Expression 2]}$$

By comparing the signal-to-interference-plus-noise ratio with the threshold that is specified based on the secondary use evaluation criteria (e.g., the signal-to-interference-plus-noise ratio), the usage evaluation is performed. At this time, it is preferable to provide a margin for compensating the prediction error expected in the above-mentioned interference state prediction.

The request distinguish unit 102 distinguishes whether the request from the secondary transmission station 20 is the primary request or the secondary request. In the case of the primary request, the request distinguish unit 102 searches the list of available channels and conditionally available channels based on the type of the secondary transmission station and the installation height of the secondary transmission station using the available channel database 300. The request distinguish unit 102 has a function to notify the secondary transmission station 20 of the list of the available channels and the conditionally available channels via the communication unit 104. While in the case of the secondary request, the request distinguish unit 102 has a function to instruct the evaluation unit 101 to perform the detailed usage evaluation and notify the secondary transmission station 20 of an evaluation result via the communication unit 104.

The updating unit 103 has a function to update the dynamic information of the secondary system database 310 at a predetermined cycle during operation or every time the secondary use information is reported by the secondary transmission station 20 based on the secondary use report of the channel which the secondary transmission station 20 has sent a notification of.

The communication unit 104 has a function to communicate with the secondary transmission station 20 wired or wirelessly and deploy the information to the request distinguish unit 102 in the case of the request from the secondary transmission station and deploy the information to the updating unit 103 in the case of the secondary use report.

Figure 3:
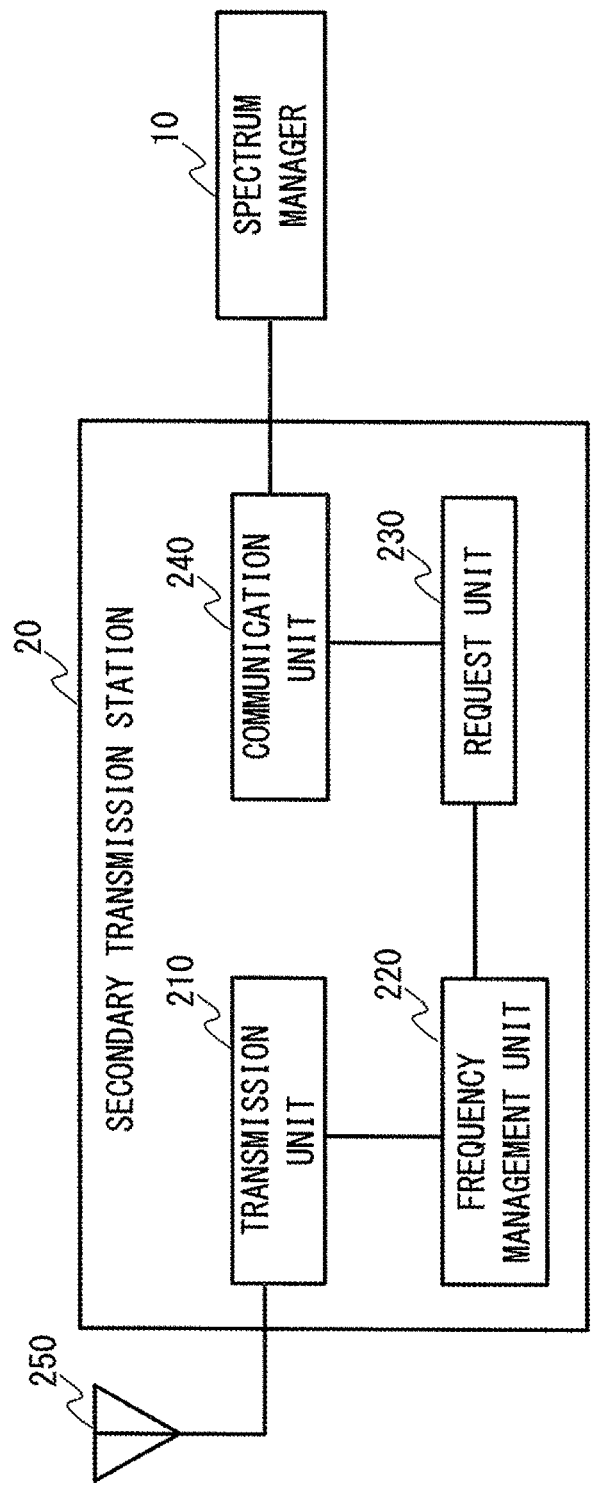
FIG. 3 is a block diagram of a secondary transmission station according to the first exemplary embodiment.

FIG. 3 shows a specific configuration example of the secondary transmission station 20 of this exemplary embodiment. The secondary transmission station 20 is configured to include a transmission unit 210, a frequency management unit 220, a request unit 230, a communication unit 240, and an antenna 250. The transmission unit 210 has a function to generate a radio signal and transmit the generated radio signal to the secondary reception station 210 via the antenna 250. The frequency management unit 220 has a function to manage and control the channel and transmission power used by the radio signal that is generated by the transmission unit 210. The request unit 230 has a function to hold the static information necessary for the request and transmit the primary and secondary requests for the secondary use of the white space to the spectrum manager 10. Further, the request unit 230 has a function to transmit information, such as a use channel, the transmission power, and transmission time, to the spectrum manager 10 as the secondary use report when the secondary use starts or ends. The communication unit 240 has a function to communicate with the spectrum manager 10 wirelessly or wired.

Note that although in the above explanation, the secondary transmission station 20 obtains the information of the available channel database 300 via the spectrum manager 10, the secondary transmission station 20 may directly access the available channel database without passing via the spectrum manager 10.

Figure 4:
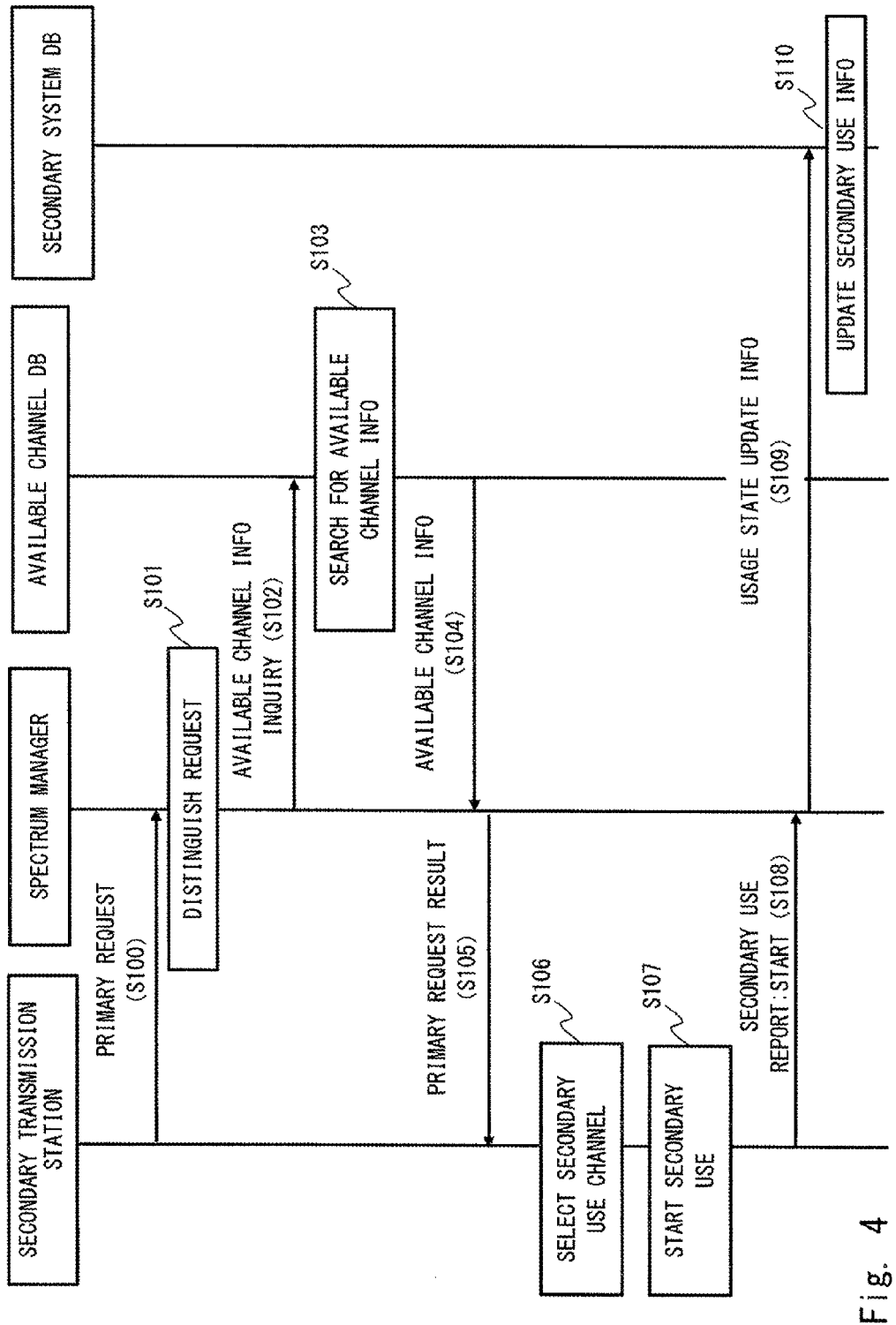
FIG. 4 is a sequence diagram showing an operation of secondary use by the secondary transmission station according to the first exemplary embodiment.
Figure 5:
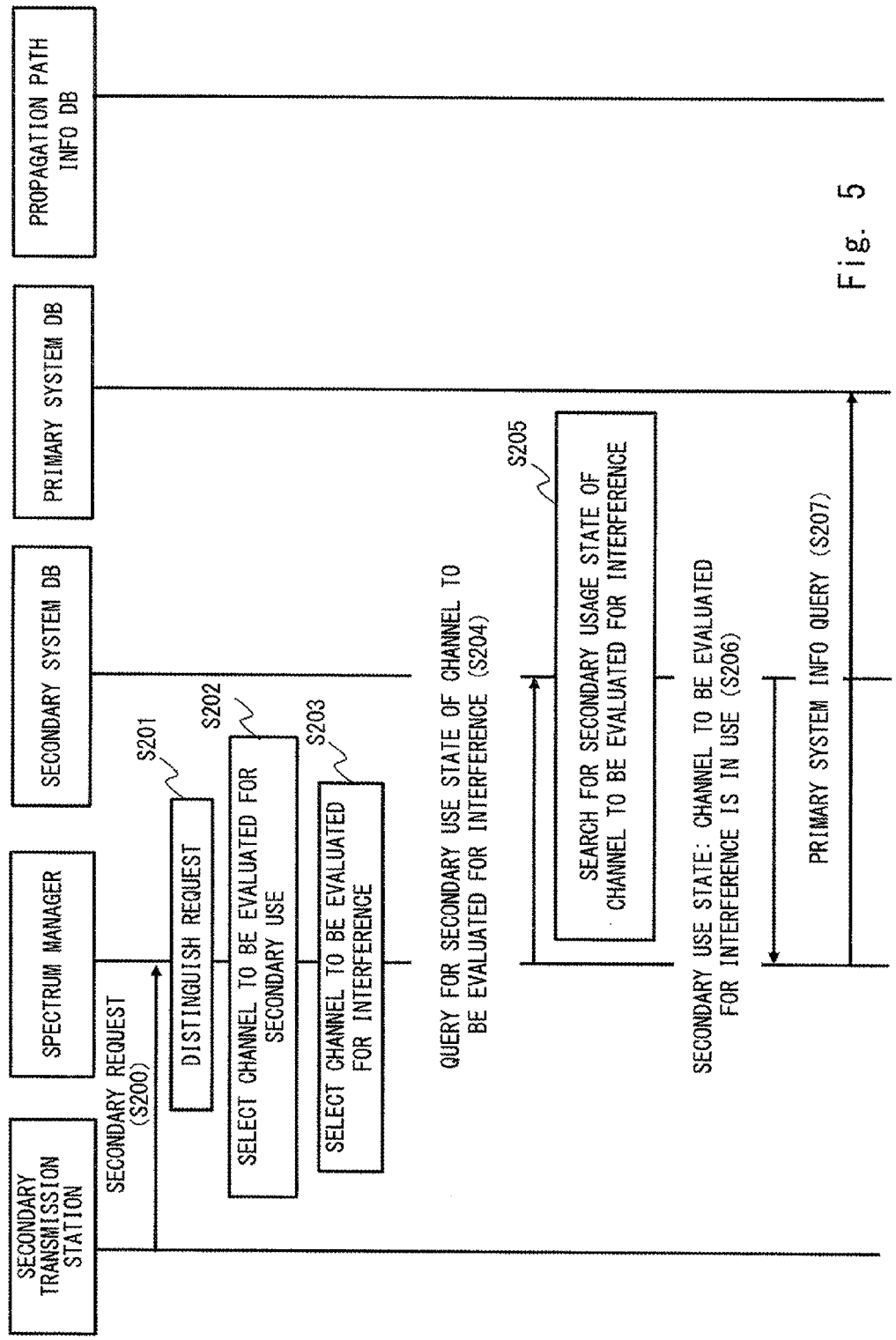
FIG. 5 is a sequence diagram showing the operation of the secondary use by the secondary transmission station according to the first exemplary embodiment.
Figure 6:
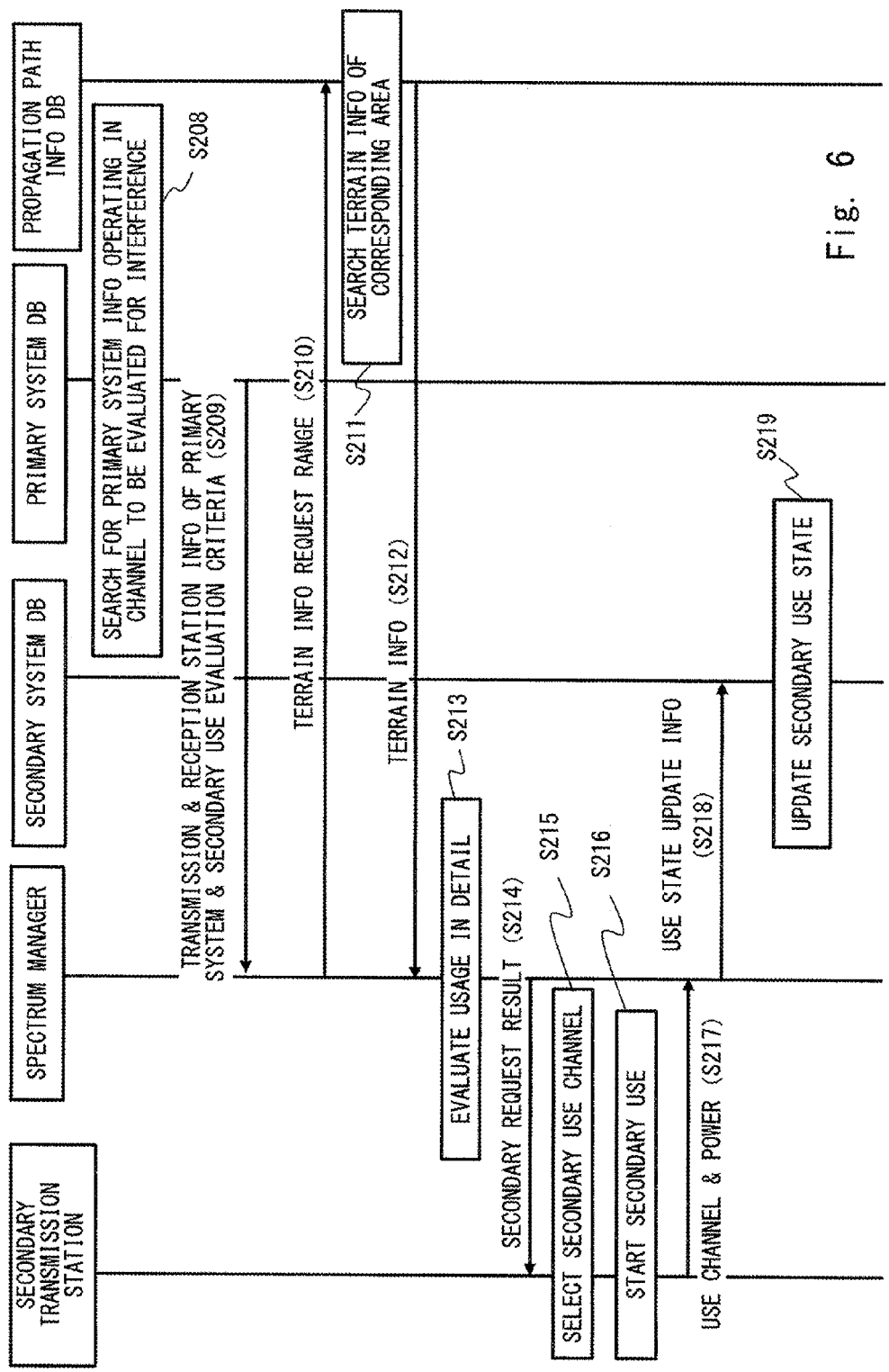
FIG. 6 is a sequence diagram showing the operation of the secondary use by the secondary transmission station according to the first exemplary embodiment.

FIGS. 4 to 6 are sequence diagrams showing an operation of this exemplary embodiment. FIG. 4 illustrates an operation when, if the secondary transmission station 20 makes the primary request due to a need arising for the secondary use of the white space by itself, the secondary transmission station 20 is notified of the result thereof and actually performs the secondary use. The secondary transmission station 20 detects, by the frequency management unit 220, the arising of the need for the secondary use of the white space by itself. The request unit 230 transmits the primary request notifying the spectrum manager 10 of the information of itself necessary for the request and that the secondary use of the white space is needed via the communication unit 240 (S100). At this time, as the information of the secondary transmission station 20, the request unit 230 transmits, for example, the installation position, the type, such as the portable device or the fixed device, and the transmission antenna installation height of the secondary transmission station 20. The spectrum manager 10 receives the primary request via the communication unit 104, and the request distinguish unit 102 distinguishes whether the received request is the primary request or the secondary request (S101). When the received request is distinguished as being the primary request, the request distinguish unit 102 queries the available database 300 for the available channels to the secondary transmission station 20 which transmitted the primary request (S102). At this time, the information of the secondary transmission station 20 is also sent. In response to the query from the spectrum manager 10, the available channel database 300 searches the list of the channels which are available and conditionally available to the secondary transmission station 20 based on information, such as the installation position and the type of the secondary transmission station 20 and the transmission antenna installation height (S103) and transmits a search result to the spectrum manager 10 (S104). The spectrum manager 10 notifies the secondary transmission station 20 of the search result as a request result for the request via the communication unit 104 (S105). The secondary transmission station 20 receives the list of the available channels via the communication unit 240 and selects, by the frequency management unit 220, a channel which will be actually used from the received list of the available channels (S106). After that, the secondary transmission station 20 sets the configuration of the transmission unit 210 to the selected channel and starts the secondary use (S107). An acceptable value of the transmission power shall be specified beforehand, and the transmission power is set within the range. After that, the request unit 230 reports the information on the channel which will be actually used for the secondary use and the transmission power to the spectrum manager 10 via the communication unit 240 (S108). The spectrum manager 10 receives the secondary use report via the communication unit 104, and the updating unit 103 transmits the usage state update information to the secondary system database 310 (S109). The secondary system database 310 updates the secondary use state based on the received usage state update information (S110).

In FIGS. 5 and 6, when only the available channels, regarding which a notification has been sent as a result of the primary request, are insufficient, the secondary transmission station 20 makes the secondary request for requesting the detailed usage evaluation on the conditionally available channels. These drawings illustrate an operation when the spectrum manager 10 performs the detailed usage evaluation, sends a notification of the result thereof, and the secondary use is actually performed. In the secondary transmission station 20, when the frequency management unit 200 detects that only the available channels, regarding which a notification is sent as a result of the primary request, are insufficient, the request unit 230 transmits the secondary request to the spectrum manager 10 via the communication unit 240 (S200). Note that at the time of the secondary request, in addition to the information sent in the primary request, information including at least one channel which the secondary transmission station 20 wishes to use as the secondary use from among the conditionally available channels and the transmissions power is sent. The spectrum manager 10 receives the request via the communication unit 104, and the request distinguish unit 102 distinguishes whether the received request is the primary request or the secondary request (S201). When the received request is distinguished as being the secondary request, the evaluation unit 101 checks whether there are a plurality of channels requested by the secondary request and if there are, selects one from among the plurality of channels and regards the selected channel as the channel to be evaluated for the secondary use (S202). The spectrum manager 10 selects one channel that influences the channel to be evaluated for the secondary use (e.g., either a channel the same as the channel to be evaluated for the secondary use or a channel adjacent thereto) as a channel to be evaluated for interference (S203), and the spectrum manager 10 queries the secondary system database 310 for the information of the secondary transmission station that is using the channel to be evaluated for interference (S204). The secondary database 310, which received the query, detects the secondary transmission station that is using the channel to be evaluated for interference from the dynamic information, extracts the static information of the secondary transmission station (S205), and notifies the evaluation unit 101 about it (S206). The evaluation unit 101 queries the primary system database 320 for the information of the primary system operating the channel to be evaluated for interference and the secondary use evaluation criteria (S207). The primary system database 320, which received the query, searches for the information of the primary transmission station, which is the information of the primary system operating the channel to be evaluated for interference, the information of the primary reception station that is included in the protection zone and is to be protected, and the secondary use evaluation criteria (S208), and notifies the evaluation unit 101 (S209) about them. The evaluation unit 101 queries the propagation path information database 330 for the propagation path information (e.g., information of an altitude and feature) that is necessary for calculating the propagation loss between the primary reception station and the secondary transmission station based on the positions of the primary reception station and the secondary transmission station that uses the channel to be evaluated for interference (S210). The propagation path information database 330 searches for the terrain information of the matching zone (S211) and notifies the evaluation unit 101 (S212) about it. The evaluation unit 101, which obtained the terrain information of the secondary transmission station 20, the primary system, and the range which should be considered, performs the detailed evaluation on the channel to be evaluated of the secondary transmission station (S213). Note that at the time of this evaluation, when there are a plurality of primary reception stations which should be protected, channels to be evaluated for interference, or both of them, only when the channel to be evaluated for the secondary use is evaluated as being the available channel by all the primary reception stations and channels to be evaluated for interference, is the channel to be evaluated for the secondary use evaluated as being the channel available to the secondary transmission station, which transmitted the secondary request, and in other cases, the channel to be evaluated for the secondary use is evaluated as being the channel unavailable for the secondary use. Also note that when there are a plurality of channels to be evaluated for the secondary use, the processing from S202 to S213 is repeatedly performed. When the evaluation for the secondary use ends, the evaluation unit 101 notifies the secondary transmission station 20 of the result of the secondary request via the communication unit 104 (S214). Receiving the request, starting the secondary use by the secondary transmission station, and updating processing of the secondary database (S215 to S219) is the same as the processing from S106 to S110 in FIG. 4, and thus an explanation shall be omitted.

Note that in the above explanation, the propagation prediction is sequentially performed on every secondary request using the terrain information. However, when the secondary transmission station is a fixed device and the position and the transmission antenna installation height can be obtained in advance, the prediction result of the propagation loss using the terrain information may be stored to the propagation path information database 330 in advance, and it may be retrieved as necessary. It is thus possible to reduce the time taken for prediction of the level of interference.

Note that in the above S105, when there is no available channel or the available channel is not selected as the secondary use channel, the processing from S106 onward may be skipped and the secondary request (S200) may be made.

Note that in the above explanation, the secondary transmission station 20 notifies the spectrum manager 10 of the secondary use report after the secondary use is started, however it is not limited to this order. For example, the secondary use may be started after notification of the secondary use report is sent. Alternatively, an order may be employed such that after the spectrum manager 10 transmits a notification of reception of a secondary use start report to the secondary transmission station 20, the secondary transmission station 20 starts the secondary use. Moreover, the spectrum manager 10 may notify the secondary transmission station 20 that the secondary use report has been received after updating of the secondary system database 310 ends.

Note that although in the above explanation, it is stated that when there are a plurality of channels to be evaluated for the secondary use, the spectrum manager 10 notifies the secondary transmission station 20 of the list of channels available for the secondary use, it is not limited to this, and the spectrum manager 10 may sequentially transmit the result as soon as the evaluation on the channel to be evaluated for the secondary use ends. In such a case, the secondary transmission station 20 may perform the processing from selecting the secondary use channel (S215) to the processing of updating the secondary use state of the database (S219) as necessary when notification of the result of the evaluation for the secondary use is sent and may skip the processing from the selection of the secondary use channel (S215) onward when a necessary band is obtained.

Note that although in the above explanation, it is stated that the secondary transmission station 20 retrieves the information in the secondary use available channel database 300 via the spectrum manager 10, it is not limited to this and the secondary transmission station 20 may directly access the secondary use available channel database and retrieve the information.

Also note that although in the above explanation, it is stated that the level of interference calculated based on the detailed terrain information is used for the evaluation of the conditionally available channel, it is not limited to this and, for example, only a check may be performed that the number of other secondary transmission stations using the channel to be evaluated for the secondary use is less than or equal to a threshold (e.g., 10 stations) within a predetermined distance (e.g., 10 km) from the secondary transmission station that requires a detailed evaluation. In such a case, the secondary use evaluation criteria include the predetermined distance and an upper limit of the secondary transmission stations that perform the secondary use at the same time.

Note that although in the above explanation, it is stated that in the evaluation of the conditionally available channels, one detailed usage evaluation is performed, the evaluation is not limited to this and it may instead be performed a plurality of times so that the above-mentioned evaluation of the number of simultaneous secondary use in the secondary use channel may be performed first, and when the number exceeds the threshold, the detailed secondary use evaluation taking into account the terrain is performed.

According to this exemplary embodiment, by performing an evaluation based on the detailed estimation of the level of interference on an area that might interfere on the primary reception station more than or equal to a reference, it is possible to expand the secondary use of frequencies while reducing the probability of interfering of the primary reception station more than or equal to the reference. Further, by performing a brief evaluation on the area that is sufficiently protected from the interference, it is possible to reduce the time taken for the evaluation and also reduce the time before starting the secondary use.

Second Exemplary Embodiment

In a pattern diagram of a wireless communication system according to a second exemplary embodiment of the present invention, the spectrum manager 10 of the first exemplary embodiment shown in FIG. 1 is replaced with a spectrum manager 11, and the primary system database 320 includes new information. Therefore, an explanation shall only be given of the spectrum manager 11 and the information added to the primary system database 320, while an explanation of the other components shall be omitted.

Figure 7:
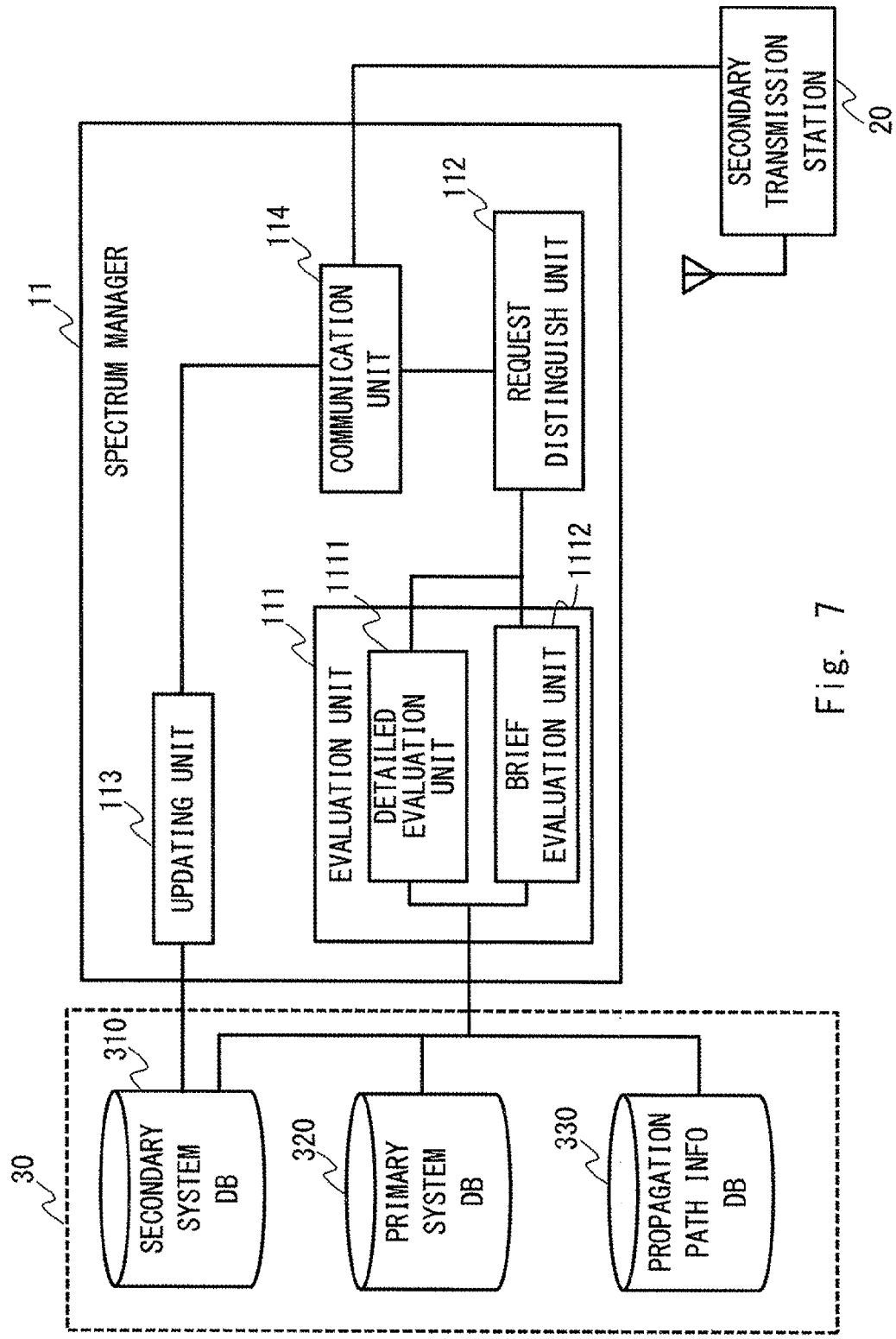
FIG. 7 is a block diagram of a spectrum manager and a database according to a second exemplary embodiment.

FIG. 7 shows a specific configuration example of the spectrum manager 11 and a connection between the secondary transmission station 20 and the database 30. In the spectrum manager 11, the evaluation unit 101 of the first exemplary embodiment is replaced with an evaluation unit 111 that includes a detailed evaluation unit 1111 and a brief evaluation unit 1112. Since other configuration blocks, which are a request distinguish unit 112, an updating unit 113, and a communication unit 114, are the same as the request distinguish unit 102, the updating unit 103, and the communication unit 104 of the first exemplary embodiment, only an explanation of the evaluation unit 111 shall be given.

In a manner similar to the evaluation unit 101 of the first exemplary embodiment, the evaluation unit 111 has a function to perform a detailed usage evaluation using the detailed evaluation unit 1111 when the secondary request is made by the request distinguish unit 112. Meanwhile, the evaluation unit 111 also has a function to perform a brief evaluation using the brief evaluation unit 1112 when a primary request is made by the request distinguish unit 112. Unlike the detailed usage evaluation, in the brief usage evaluation, a part of the processing is simplified. For example, the method explained in the categorization of the available channel or the conditionally available channel in the available channel database 300 may be employed. However, there are two points shown below in which the brief usage evaluation differs from the above-mentioned method. Firstly, as for the installation position and the installation height, the values of the secondary transmission station 20 that request the secondary use are used. Secondly, a state of interference (In:n=1, 2 and 3, . . . , N) on the primary reception station by the other secondary transmission stations is calculated, and the signal-to-interference-plus-noise ratio in the primary reception station is calculated by (expression 2).

Figure 8:
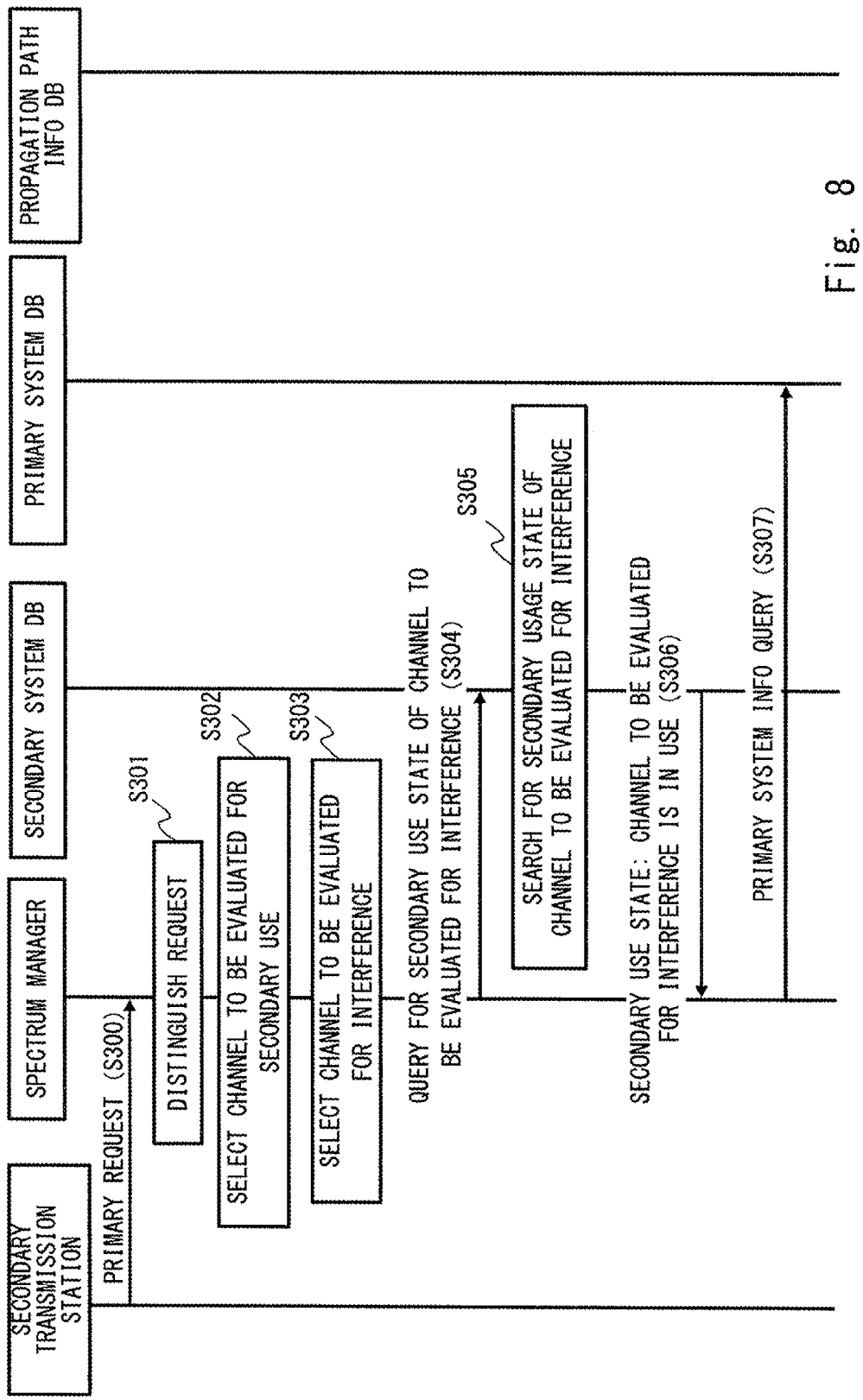
FIG. 8 is a sequence diagram showing an operation of secondary use by a secondary transmission station according to the second exemplary embodiment.
Figure 9:
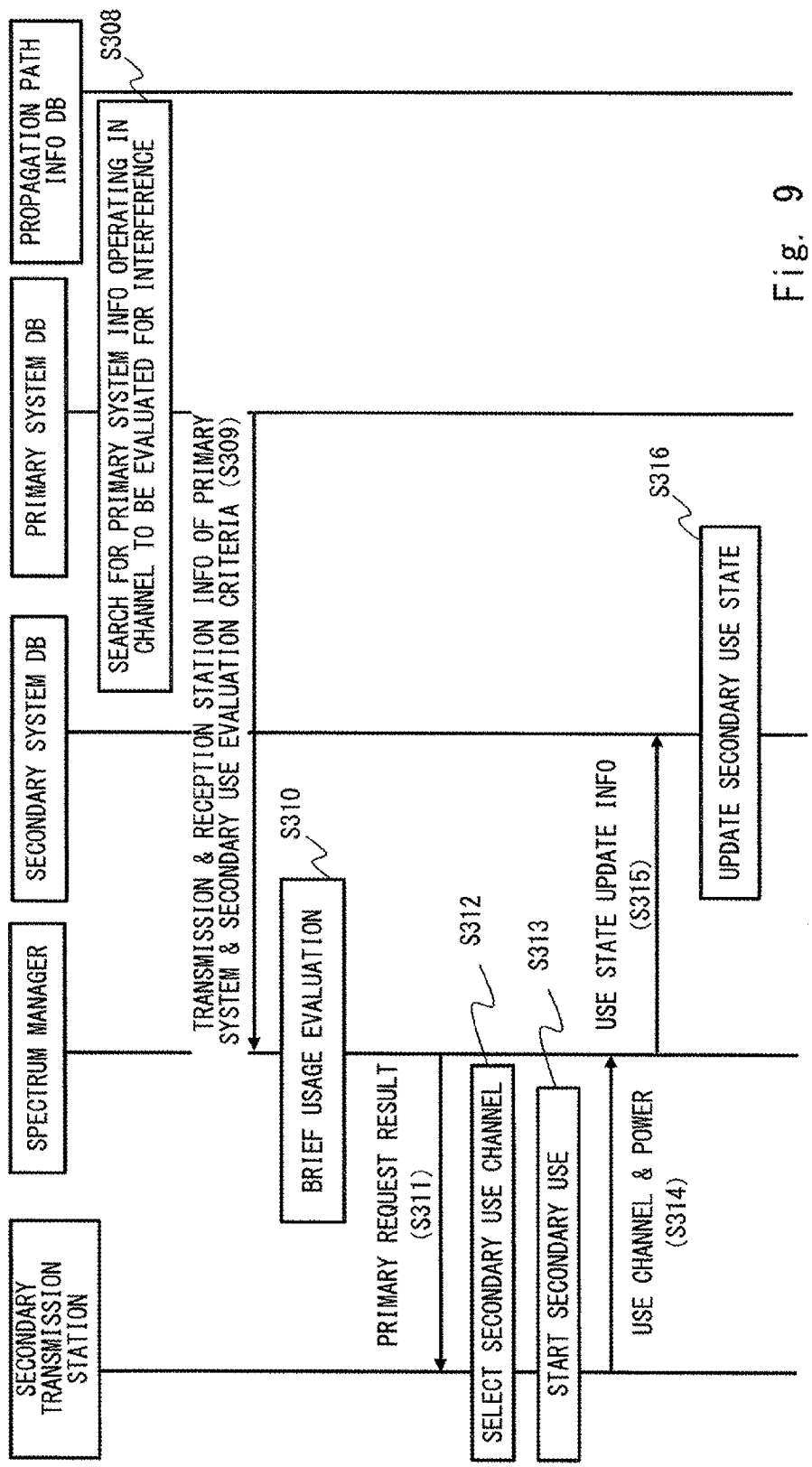
FIG. 9 is a sequence diagram showing the operation of the secondary use by the secondary transmission station according to the second exemplary embodiment.

FIGS. 8 and 9 are sequence diagrams showing an operation of this exemplary embodiment. FIG. 4 illustrates an operation when the secondary transmission station 20 makes the primary request due to a need arising for the secondary use of the white space by itself, the secondary transmission station 20 is notified of a result thereof, and actually performs the secondary use. Note that an explanation shall be given using the following sequence diagrams assuming that a brief usage evaluation of this exemplary embodiment uses an interference evaluation method based on simple propagation prediction not requiring the terrain information, and further, the primary reception station which should be protected and performs the interference evaluation selects a station that exists at an intersection of a boundary of the protection zone that exists on a line connecting between the primary transmitter and the secondary transmitter. The secondary transmission station 20 transmits the primary request to the spectrum manager 11 in a manner similar to the processing of S100 of the first exemplary embodiment. The spectrum manager 11 receives the request via the communication unit 114, and the request distinguish unit 112 distinguishes whether the received request is the primary request or the secondary request. In the case of the primary request, the spectrum manager 11 uses the brief evaluation unit 1112 to perform the usage evaluation, while in the case of the secondary request, the spectrum manager 11 uses the detailed evaluation unit 11111 to perform the usage evaluation (S301). When the brief evaluation unit 1112 receives the primary request from the secondary transmission station 20, the brief evaluation unit 1112 selects one channel to be evaluated for the secondary use from among the channels that might be used for the secondary use in order to perform a brief secondary use evaluation (S302). The channels that might be used for the secondary use from which the channel to be evaluated for the secondary use in order to perform the brief evaluation for the secondary use is selected are, specifically, candidate channels that might be allowed by the primary system if the channels satisfy predetermined conditions. Since the processing from S303 to S309 is the same as the processing from S201 to S208 of the first exemplary embodiment, an explanation thereof shall be omitted. The brief evaluation unit 1112, which obtained the information of the secondary transmission 20 and the primary system, performs the brief evaluation on the channels to be evaluated of the secondary transmission station (S310). Since the processing from S311 to S316 is the same as the processing from S105 to S110 of the first exemplary embodiment, an explanation thereof shall be omitted. Further, the processing in the case of the secondary request that uses the detailed evaluation unit 1111 is the same as that of the evaluation unit 101 of the first exemplary embodiment, and thus an explanation shall be omitted.

Figure 10:
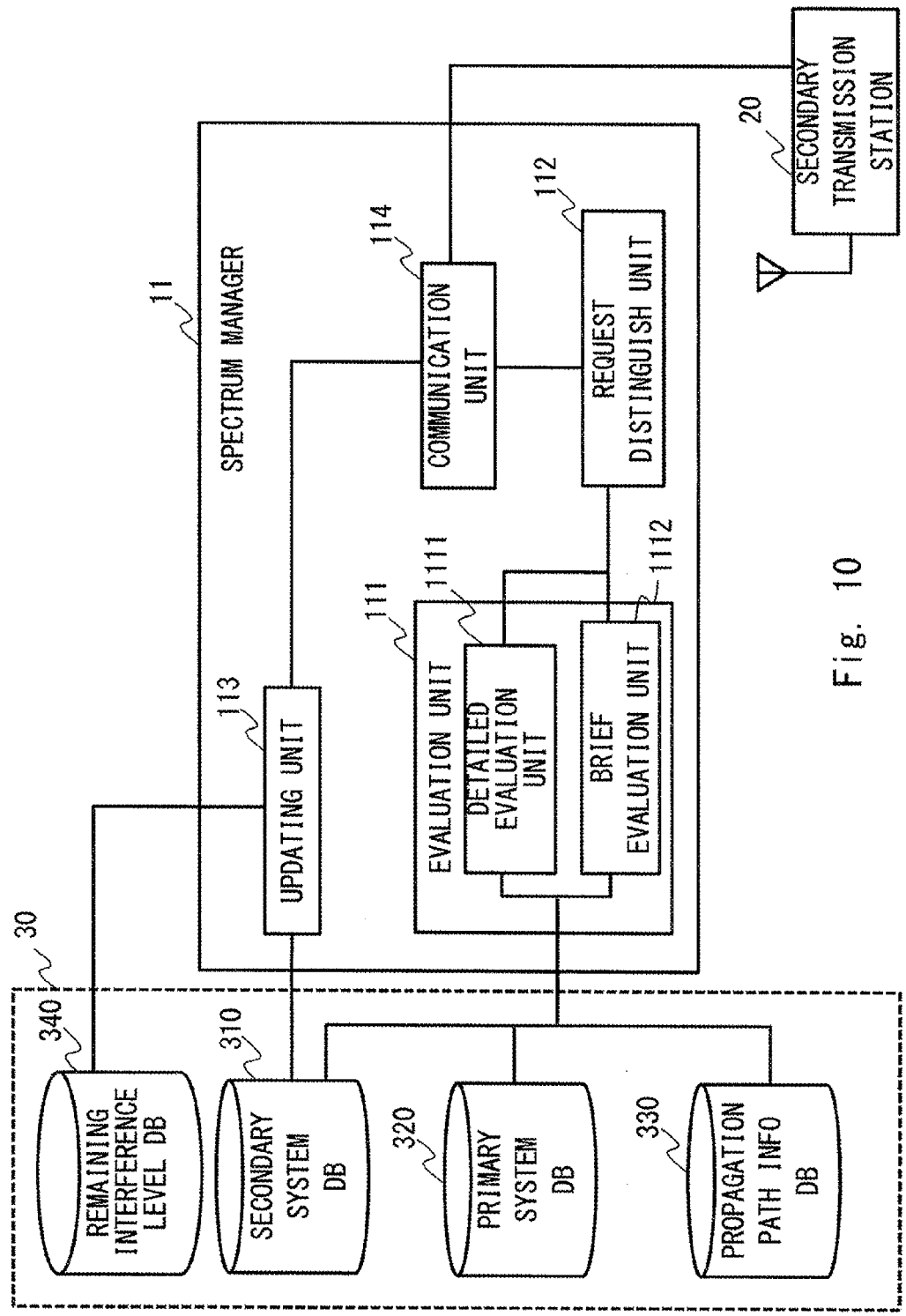
FIG. 10 is a block diagram of the spectrum manager and the database according to the second exemplary embodiment.

Note that in the above explanation, the level of interference of the representative primary reception station for performing the interference evaluation is calculated every time the request is transmitted. However, by storing received levels of interference for the respective primary reception stations which should be protected and are within a specified range from a new secondary transmission station at the time of updating the secondary use state, it is possible to reduce the time taken for the secondary use evaluation if the same secondary transmission station uses the stored information from the second time onward. Further, before the received level of interference is stored, the information necessary for the detailed calculation is extracted from the respective databases, the spectrum manager 11 performs an additional calculation by the method used to perform the detailed secondary use evaluation, and after that, the received level of interference is registered to the database. It is thus possible to more accurately take into account the received level of interference from the existing secondary transmission stations with high accuracy and thus to increase a probability of protecting the primary reception station. As an example of the configuration in such a case, a remaining interference level database 340 is added as a new component as shown in FIG. 10, so that it is possible to obtain the level of interference from the transmitter of the secondary system which is performing the secondary use.

Note that in the above explanation, in limiting the stations to be evaluated, only the primary reception station which should be protected and exists at the shortest distance is used, however a plurality of primary reception stations existing within a specified range from the primary reception station at the shortest distance may be used to improve the evaluation accuracy. Moreover, the specified number of the reception stations of the primary system may be selected in a descending order of the remaining interference level using the remaining interference level database, or all the reception stations of the primary system having the remaining interference level less than or equal to a specified value may be taken into consideration.

According to this exemplary embodiment, it is possible to prevent the interference on the primary reception station caused by an increase in the number of the secondary transmission stations that perform the secondary use from exceeding a reference.

Third Exemplary Embodiment

In a pattern diagram of a wireless communication system according to a third exemplary embodiment of the present invention, the spectrum manager 10 of the first exemplary embodiment shown in FIG. 1 is replaced with a spectrum manager 12, and the secondary transmission station 20 is replaced with a secondary transmission station 21. Therefore, an explanation shall be given only of the spectrum manager 12 and the secondary transmission station 21, while an explanation of other components shall be omitted.

Figure 11:
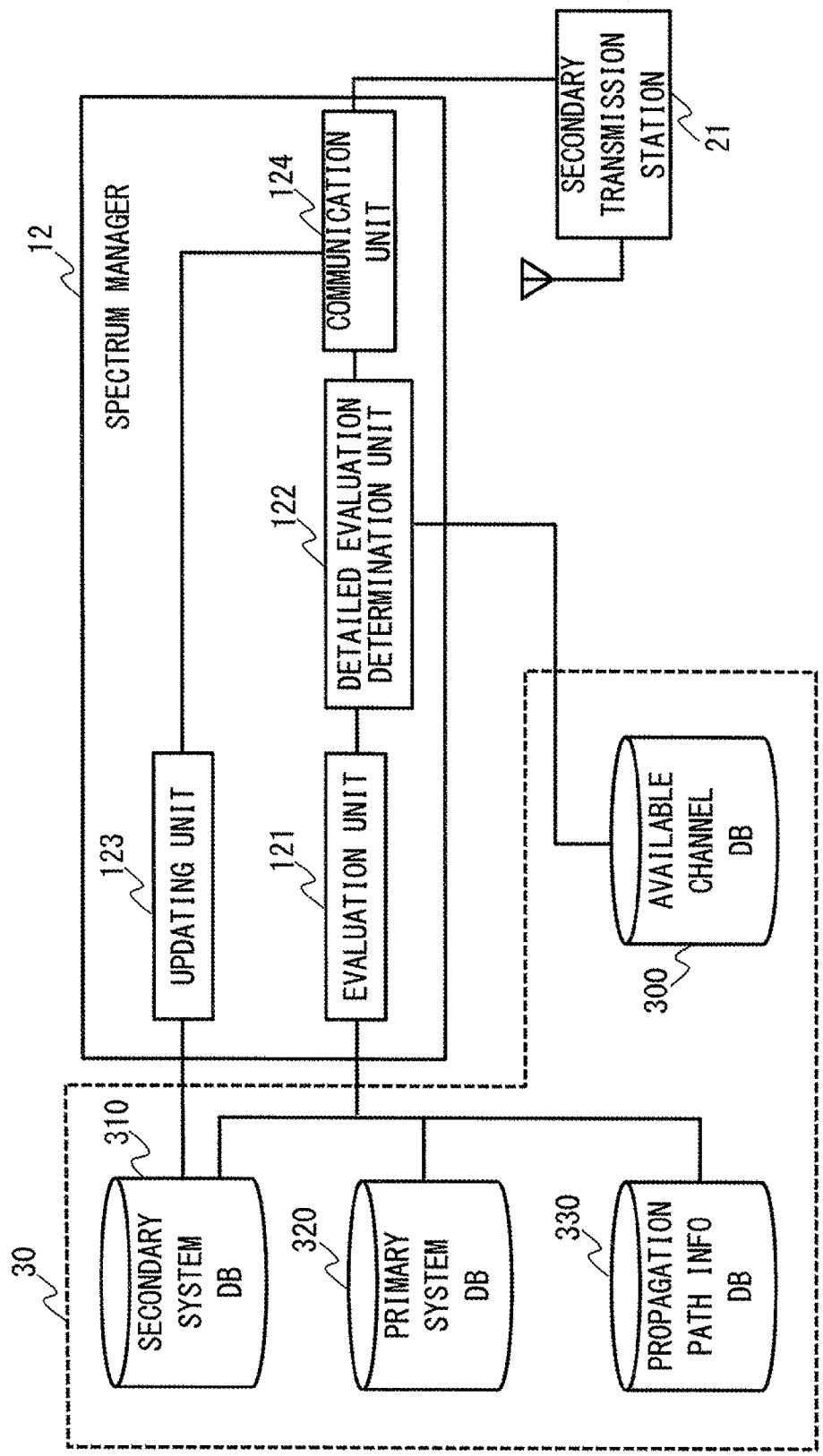
FIG. 11 is a block diagram of a spectrum manager and a database according to a third exemplary embodiment.

FIG. 11 shows a specific configuration example of the spectrum manager 12 of this exemplary embodiment and a connection between the secondary transmission station 21 and the database 30. As shown in FIG. 11, in the spectrum manager 12, the request distinguish unit 102 of the first exemplary embodiment is replaced with a detailed evaluation determination unit 122. Since other configuration blocks, which are an evaluation unit 121, an updating unit 123, and a communication unit 124 are the same as the evaluation unit 101, the updating unit 103, and the communication unit 104 of the first exemplary embodiment, only an explanation of the detailed evaluation determination unit 122 shall be given.

In response to the primary request from the secondary transmission station 21, the detailed evaluation determination unit 122 has a function to firstly connect to the available channel database 300, examine the available channels to the secondary transmission station, and when the conditionally available channel is included in the available channels, use the evaluation unit 121 to perform an examination in order to obtain an evaluation result based on the detailed calculation of the channel.

The secondary transmission station 21 is configured to include a new request unit 231 that does not include the transmission function of the secondary request in place of the request unit 230 of the first exemplary embodiment, and other configuration blocks, which are the transmission unit 211, the frequency management unit 221, the communication unit 241, and the antenna 251. Since the only difference from the components of the secondary transmission station 20 of the first exemplary embodiment is the deletion of the transmission function of the secondary request in the request unit 230 of the secondary transmission station 20, a detailed explanation of the components shall be omitted.

Figure 12:
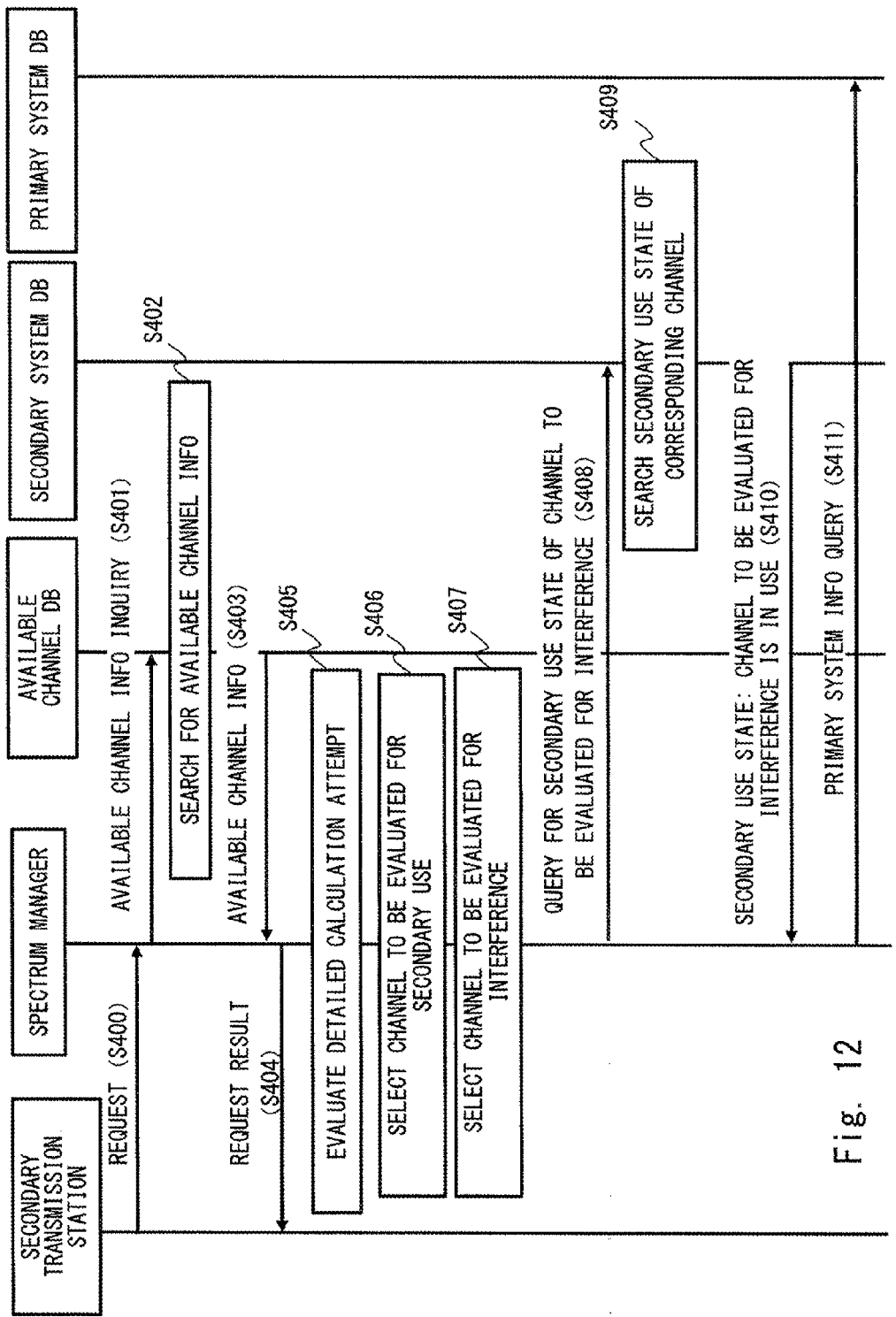
FIG. 12 is a sequence diagram showing an operation of secondary use by a secondary transmission station according to the third exemplary embodiment.
Figure 13:
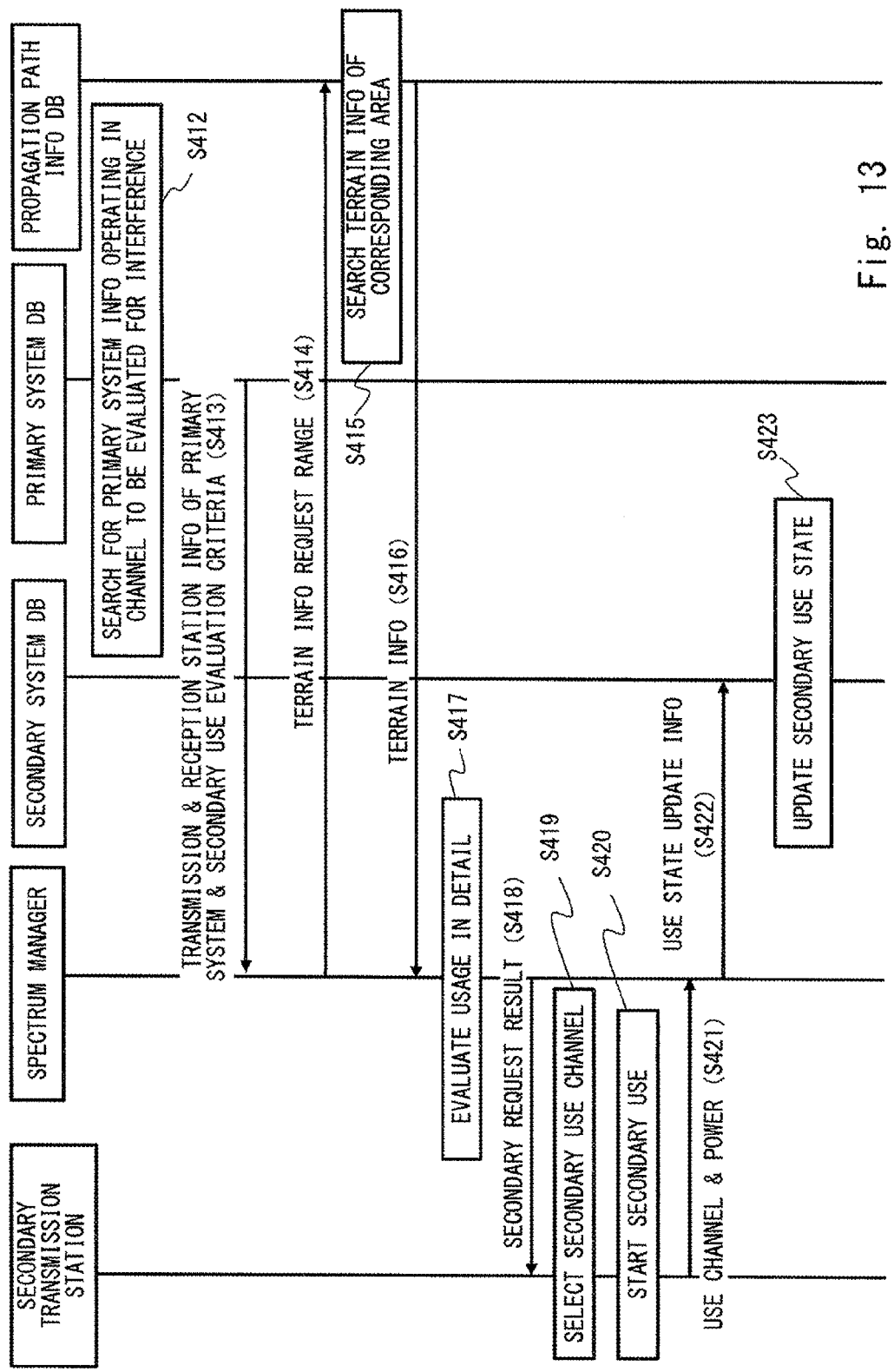
FIG. 13 is a sequence diagram showing the operation of the secondary use by the secondary transmission station according to the third exemplary embodiment.

FIGS. 12 and 13 are sequence diagrams showing an operation of this exemplary embodiment. These sequence diagrams illustrate an operation when, if the secondary transmission station 21 makes the primary request due to a need arising for the secondary use of the white space by itself, the secondary transmission station 21 is notified of a result thereof, a detailed usage evaluation is performed, and the secondary transmission station 21 actually performs the secondary use based on a result thereof. The secondary transmission station 21 transmits the primary request to the spectrum manager 12 in a manner similar to that of the processing of S100 of the first exemplary embodiment (S400). As the processing from S401 to S404 is the same as the processing from S102 to S105 of the first exemplary embodiment, a detailed explanation shall be omitted. Moreover, although the processing from S404 onward of the secondary transmission station 21, which has received the list of available channels as a result of the request in S404, is not shown in the sequence, the selection of a channel based on the result, the secondary use report and the accompanying updating processing of the secondary system database is the same as the processing from S106 to S110, and thus an explanation shall be omitted. Next, the spectrum manager 12 determines whether to perform the detailed usage evaluation depending on whether or not the conditionally available channel exists, which is a result of the transmission (S405). Specifically, when there is a conditionally available channel, the spectrum manager 12 determines that it is necessary to attempt the detailed usage evaluation, whereas when there is no conditionally available channel, the spectrum manager 12 determines that it is unnecessary to attempt the same. Note that as the processing after that, which is the processing from S406 to S423, is the same as the processing from S202 to S219 of the first exemplary embodiment, a detailed explanation shall be omitted.

Also note that although in the above explanation, the available channel database 300 is used for the brief usage evaluation, the evaluation is not limited to this, and instead the evaluation unit 111 shown in FIG. 6 of the second exemplary embodiment may perform the brief evaluation each time, and the detailed evaluation determination unit 122 may determine whether it is necessary to perform the detailed evaluation based on a result thereof.

According to this exemplary embodiment, by the detailed secondary use evaluation performed actively by the spectrum manager, it is possible to eliminate the need for the secondary transmission station to transmit the secondary request and reduce the time taken for obtaining the detailed evaluation result.

INDUSTRIAL APPLICABILITY

The present invention can be applied to applications such as wireless systems that share frequencies and a cognitive wireless system that is composed of a control device for evaluating whether or not to allow the sharing depending on an interference state of systems. The present invention can be applied to an application, such as a control system of a wireless communication that evaluates interference.

Note that the present invention is not limited by the above exemplary embodiments and appropriate modifications can be made without departing from the scope thereof.

Although the explanation of the above exemplary embodiments was given using, for example, a hardware configuration, they are not limited to this. The processing of the spectrum manager can be realized by causing a CPU (Central Processing Unit) to execute a computer program. In such a case, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present invention has been explained with reference to the exemplary embodiments, the present invention is not limited by the above. Various modifications that can be understood by a person skilled in the art can be made to the configurations and details of the present invention within the scope of the invention.

The present application claims priority rights of and is based on Japanese Patent Application No. 2011-235072 filed on Oct. 26, 2011 in the Japanese Patent Office, the entire contents of which are hereby incorporated by reference.

REFERENCE SIGNS LIST 10, 11, and 12 SPECTRUM MANAGERS
20 SECONDARY TRANSMISSION STATION
30 DATABASE
40 PRIMARY TRANSMISSION STATION
101, 111, and 121 EVALUATION UNITS
102 and 112 REQUEST EVALUATION UNITS
122 DETAILED EVALUATION DETERMINATION UNIT
103, 113, and 123 UPDATING UNITS
104, 114, and 124 COMMUNICATION UNITS
201 SECONDARY RECEPTION STATION
210 TRANSMISSION UNIT
220 FREQUENCY MANAGEMENT UNIT
230 REQUEST UNIT
240 COMMUNICATION UNIT
250 ANTENNA
300 AVAILABLE CHANNEL DATABASE
310 SECONDARY SYSTEM DATABASE
320 PRIMARY SYSTEM DATABASE
330 PROPAGATION PATH INFORMATION DATABASE
340 REMAINING INTERFERENCE LEVEL DATABASE
401 PRIMARY RECEPTION STATION
1111 DETAILED EVALUATION UNIT
1112 BRIEF EVALUATION UNIT

The invention claimed is:

1. A spectrum control system that evaluates whether or not a frequency band, which is allowed to be preferentially used by a first wireless communication system, is allowed for secondary use by a second wireless communication system, the spectrum control system comprising:
a first evaluation unit that evaluates a possibility of an influence of the secondary use on the first wireless communication system; and
a second evaluation unit that evaluates whether or not to allow the secondary use of the frequency band using an evaluation criterion more specific than that of the first evaluation unit, the frequency band having been evaluated that there is a possibility that the frequency band may influence the first wireless communication system.

2. The spectrum control system according to claim 1, wherein the first evaluation unit extracts a list of frequency bands available for the secondary use and a list of frequency bands which will be evaluated for the secondary use by the second evaluation unit from a database that stores associations with a point of a transmission station of the second wireless system.

3. The spectrum control system according to claim 1, wherein the second evaluation unit evaluates whether or not to allow the secondary use based on a prediction of a level of interference on a reception station of the first wireless system from the transmission station of the second wireless system which is expected to perform the secondary use.

4. The spectrum control system according to claim 1, wherein the second evaluation unit is based on the prediction of the level of interference on the reception station from a transmission station of the second wireless system other than the transmission station that uses the frequency band at the time when the frequency band is expected to be used for the secondary use.

5. The spectrum control system according to claim 1, wherein the second evaluation unit predicts the level of interference on the reception station by a propagation prediction taking into account at least one of terrain information and feature information.

6. The spectrum control system according to claim 1, wherein
the first evaluation unit notifies the second wireless system of information of the frequency band that is evaluated as to the possibility of it influencing the first wireless system, and
the second wireless system requests an evaluation of whether or not to allow the secondary use of the notified frequency band.

7. The spectrum control system according to claim 1, wherein the second evaluation unit evaluates whether or not to allow the secondary use of the frequency band that has been evaluated by the first evaluation unit as to whether or not the secondary use of the frequency band is to be allowed.

8. A database that stores, from among frequency bands which are allowed to be preferentially used by a first wireless communication system, frequency bands available to a second wireless communication system for secondary use in association with points of the second wireless communication system, the database storing:
a list of frequency bands evaluated as allowed for the secondary use using a first evaluation criterion and a list of frequency bands which will be evaluated as to whether or not they are to be allowed for the secondary use using a reference more specific than the first evaluation criterion.

9. A spectrum control method that evaluates whether a frequency band, which is allowed to be preferentially used by a first wireless communication system, is allowed for secondary use by a second wireless communication system, the spectrum control method comprising:
evaluating a possibility of the secondary use influencing the first wireless communication system by using a first evaluation criterion; and
evaluating whether or not to allow the secondary use of the frequency band using an evaluation criterion more specific than the first evaluation criterion, the frequency band having been evaluated that there is a possibility that the frequency band may influence the first wireless communication system.

10. A non-transitory computer readable medium storing a spectrum control program for evaluating whether a frequency band, which is allowed to be preferentially used by a first wireless communication system, is allowed for secondary use by a second wireless communication system, the program causing a computer to execute steps of:
evaluating a possibility of the secondary use influencing the first wireless communication system by using a first evaluation criterion; and
evaluating whether or not to allow the secondary use of the frequency band using an evaluation criterion more specific than the first evaluation criterion, the frequency band having been evaluated that there is a possibility that the frequency band may influence the first wireless communication system.

* * * * *